G. E. Clarke,

Cage Trap,

N° 68,046. Patented Aug. 27, 1867.

Witnesses:
J. H. Keithel
W. E. Mars

Inventor:
George E. Clarke

United States Patent Office

GREVILLE E. CLARKE, OF RACINE, WISCONSIN.

Letters Patent No. 68,046, dated August 27, 1867.

---

IMPROVEMENT IN ANIMAL TRAPS.

---

*The Schedule referred to in these Letters Patent and making part of the same.*

---

TO ALL WHOM IT MAY CONCERN:

Be it known that I, GREVILLE E. CLARKE, of Racine, in the county of Racine, and the State of Wisconsin, have invented a new and useful Improvement in Animal Traps; and I do hereby declare that the following is a full, clear, and exact description of the same, reference being had to the accompanying drawings, and letters and figures marked thereon, in which—

Figure 1:
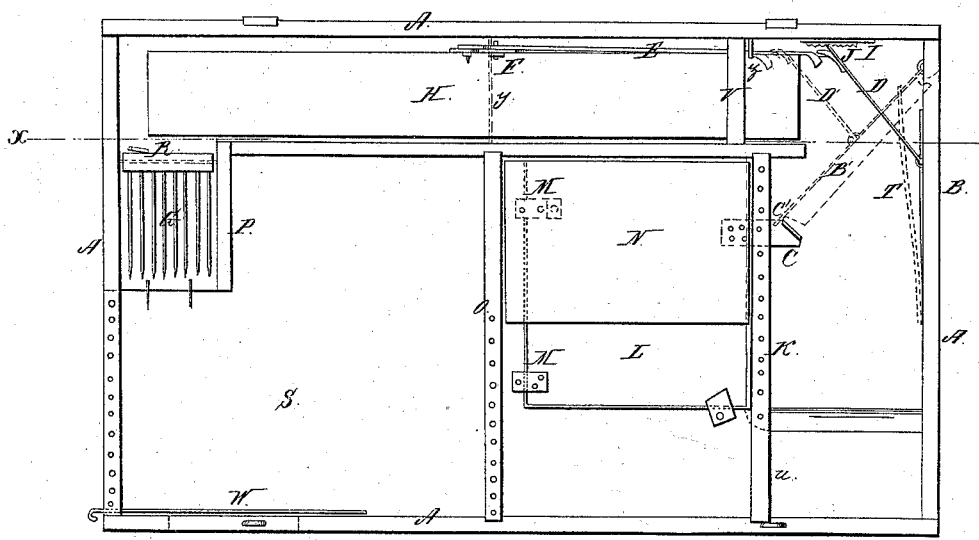

Figure 1 represents a top view of my trap with the cover removed.

Figure 2:
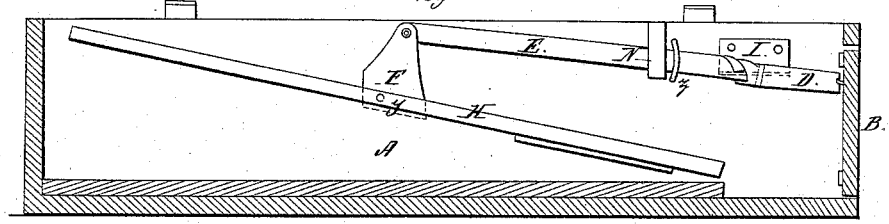

Figure 2, a vertical section at $x$ in fig. 1; and

Figure 3:
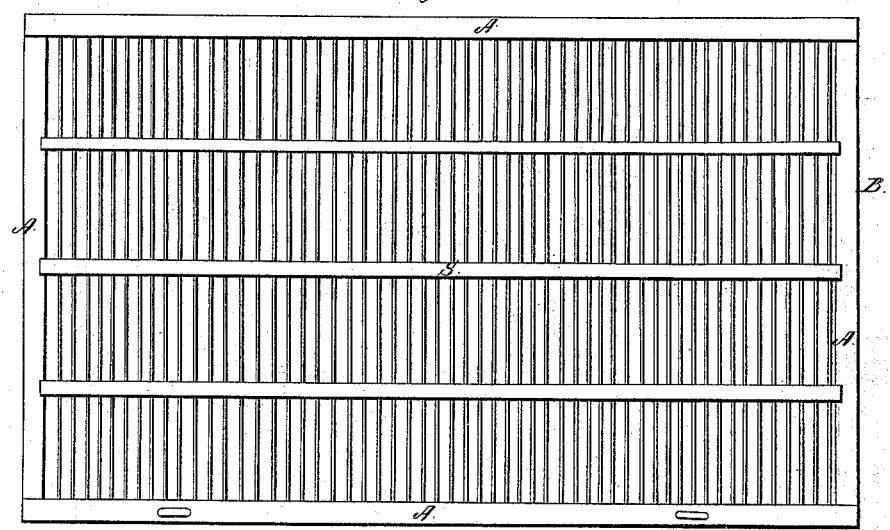

Figure 3, a top or plan view of the trap.

The nature of my invention consists in a novel construction of an animal trap, whereby the animal after passing into the trap closes or springs the same, and then by passing through into another compartment of the trap opens or sets it again.

To enable those skilled in the art to manufacture and use my invention, I will proceed to describe the same with particularity.

The same letters of reference represent corresponding parts in the different figures.

I construct a box, A, of any suitable material and size, with removable cover, S'. In one end of said box there is a door, B, at the bottom of which there is a latch, C', that latches on the catch C and holds the door open. There is a partition, K, made mostly of wire or rods, as indicated in fig. 1, with an opening at U, through which the animal passes to get to the bait, which is placed on the board N, but to reach the bait the animal must pass on to the platform L, which is so delicately hung on one side by the thin metallic straps M that the weight of the animal presses down the other side and presses the catch C off of the latch C', when the spring T causes the door to close. The animal being somewhat startled by the door closing seeks to escape from the trap, and in running about goes into the compartment in which the pivoted platform H is hung, which platform, when the door is closed, assumes the position shown in fig. 2, and as he passes up on said platform his weight causes it to turn on the pivot $y$. There is a piece, F, attached to one side of the platform H, at the top of which is attached the rod or strip E. This strip passes through the loop $z$, and is attached at J by a loose joint to the rod or strip D, which is attached to the door B. By this arrangement, as the weight of the animal turns the platform H, the top of the piece F is thrown back, which draws back the strip E and opens the door by throwing the strip or rod D into the position indicated by the dotted lines D'. There is a rack, I, attached to the side of the trap, in the notches of which one end of the strip D rests when the door of the trap is closed, which causes the said strip to serve as a brace to keep the door closed, but the strip E is so attached to D as to throw it out of said rack, when the said strip E is operated by the movement of the platform H. When the weight of the animal has turned the platform H and opened the door the front end of said platform rests against the under side of the partition V, which prevents the animal from passing back into the compartments in the front end of the trap, but he can pass into the compartment S through the opening P by raising the points G. The points G are so arranged that an animal can pass through into the compartment S, but cannot pass back again. W is a metallic slide or door, which covers an aperture through which the animal can be removed from the trap. The object in making the various partitions of the trap and parts of the ends of the trap of open work, as indicated, is to admit of the animals which are in the trap, as well as the bait, being seen by the animals outside of the trap.

Having fully described the construction and operation of my improved trap, what I claim as my invention, and desire to secure by Letters Patent, is—

The combination and arrangement of the pivoted platform H, the piece F, the strips or rods E and D, and the door B, when constructed and operating substantially as set forth.

GREVILLE E. CLARKE.

Witnesses:
H. CROSWELL,
D. McDONALD.